(12) United States Patent
Kinney, Jr. et al.

(10) Patent No.: US 7,921,053 B2
(45) Date of Patent: Apr. 5, 2011

(54) METHOD AND SYSTEM FOR CONDUCTING ELECTRONIC AUCTIONS WITH MULTI-PARAMETER PRICE EQUALIZATION BIDDING

(75) Inventors: Sam E. Kinney, Jr., Sewickley, PA (US); Vincent F. Rago, Pittsburgh, PA (US); Glen T. Meakem, Sewickley, PA (US); Robert G. Stevens, Pittsburgh, PA (US); David J. Becker, Sewickley, PA (US); Anthony F. Bernard, Wexford, PA (US); William D. Rupp, Pittsburgh, PA (US); Daniel C. Heckmann, Pittsburgh, PA (US); Julia L. Rickert, Wexford, PA (US); Shane M. Tulloch, Pittsburgh, PA (US); Jennifer L. Riddle, Pittsburgh, PA (US); Nikki A. Sikes, Pittsburgh, PA (US); John P. Levis, III, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 903 days.

(21) Appl. No.: 11/809,840

(22) Filed: Jun. 1, 2007

(65) Prior Publication Data

US 2007/0239596 A1    Oct. 11, 2007

Related U.S. Application Data

(63) Continuation of application No. 09/282,157, filed on Mar. 31, 1999, now Pat. No. 7,249,085.

(51) Int. Cl.
*G06Q 40/00* (2006.01)
(52) U.S. Cl. ........................ 705/37; 705/36 R
(58) Field of Classification Search .................. 705/37, 705/36 R, 35
See application file for complete search history.

(56) References Cited

U.S. PATENT DOCUMENTS 6,026,383 A * 2/2000 Ausubel .......................... 705/37

(Continued)

OTHER PUBLICATIONS

Lee, "Do electronic marketplaces lower the price of goods?", Communications of the PCM, v41n1 pp. 73-80, Jan. 1998.*
"Moai Technologies Introduces New categories of Business to Business Auction Software . . . ", Business Editors and Computer writers, Mar. 16, 1998.*

(Continued)

*Primary Examiner* — Hani Kazimi
(74) *Attorney, Agent, or Firm* — Van Pelt, Yi & James LLP

(57) ABSTRACT

An auction is conducted by obtaining, from a buyer, information associated with a product to be purchased using an auction, where the buyer purchases the product from a winning bidder. The obtained information associated with the product is made available to at least a first bidder and a second bidder. A first bid that includes a first price and a first non-price information is received from the first bidder. A second bid that includes a second price and a second non-price information is received, from the second bidder. Non-price information is associated with (1) a description of a particular product a given bidder will provide in the event the given bidder wins the auction and/or (2) delivery of a product by the given bidder in the event the given bidder wins the auction. A first comparison value is generated based at least in part on the first price and the first non-price information. A second comparison value is generated based at least in part on the second price and the second non-price information. The first comparison value and the second comparison value are compared and the winning bidder of the auction is selected based at least in part on the comparison.

20 Claims, 7 Drawing Sheets

U.S. PATENT DOCUMENTS

| | | | | |
|---|---|---|---|---|
| 6,035,287 A * | 3/2000 | Stallaert et al. | ............... | 705/37 |
| 6,047,274 A * | 4/2000 | Johnson et al. | ............... | 705/412 |
| 6,052,108 A * | 4/2000 | Gadd | ............... | 715/749 |
| 6,131,087 A * | 10/2000 | Luke et al. | ............... | 705/26 |
| 6,134,536 A * | 10/2000 | Shepherd | ............... | 705/37 |
| 6,161,099 A * | 12/2000 | Harrington et al. | ............... | 705/36 R |
| 6,178,431 B1 * | 1/2001 | Douglas | ............... | 715/205 |
| 6,230,146 B1 * | 5/2001 | Alaia et al. | ............... | 705/37 |
| 6,275,807 B1 * | 8/2001 | Schirripa | ............... | 705/36 R |
| 6,343,277 B1 * | 1/2002 | Gaus et al. | ............... | 705/37 |

OTHER PUBLICATIONS

"Venture Capitalists Fund Two Massachusetts Internet Related Companies", Boston Globe, Jan. 14, 1998.*

"BroadVision Developing First Interactive Commerce Management System to Support Online Sales & Marketing Process; New Software Category Necessary to Interactive Network Architecture", Business Wire, p5150152, May 15, 1995.*

* cited by examiner

|  | Coordinator | Buyer | Supplier |
|---|---|---|---|
| Initial Contact 102 | Contact Buyer | Provide Data |  |
| RFQ 104 | Collect & Administer RFQ Data | Provide RFQ Data |  |
|  | Publish & Administer RFQ |  | Access RFQ |
|  | Manage RFQ Response |  | Respond to RFQ |
| Auction Administration 106 |  | Request Auction |  |
|  | Coordinate & Administer Auction Setup |  |  |
|  | Assist & Administer User Auction Prep |  | Prepare for Auction |
| Conduct Auction 108 | Assist & Administer Auction | Observe | Bid |
| Administer Auction Results 110 | Analyze & Administer Auction Results | View Auction Results | View Auction Results |
| Contract Administration 112 |  | Settlement | Settlement |

FIG. 2 - System Flow

Buyer's View

| Bidder | Bid Time | Bid (¢/M*Btu) |
|---|---|---|
| Sup A | 01:05:51 | 98.2 |
| Sup B | 01:06:08 | 97.4 |
| Sup D | 01:06:49 | 101.3 |
| Sup C | 01:08:10 | 96.7 |
| Sup B | 01:15:09 | 95.5 |
| Sup D | 01:17:38 | 97.2 |
| Sup B | 01:18:57 | 96.2 |
| Sup E | 01:20:03 | 97.1 |
| Sup A | 01:25:28 | 94.8 |

Fig. 6A

Supplier A's View

| Bidder | Bid Time | Bid ($/ton) |
|---|---|---|
| Sup A | 01:05:51 | 20.92 |
| Sup B | 01:06:08 | 20.00 |
| Sup D | 01:06:49 | 24.48 |
| Sup C | 01:08:10 | 19.20 |
| Sup B | 01:15:09 | 17.82 |
| Sup D | 01:17:38 | 19.77 |
| Sup B | 01:18:57 | 18.62 |
| Sup E | 01:20:03 | 19.66 |
| Sup A | 01:25:28 | 17.01 |

Fig. 6B

Supplier B's View

| Bidder | Bid Time | Bid ($/ton) |
|--------|----------|-------------|
| Sup A | 01:05:51 | 20.00 |
| Sup B | 01:06:08 | 19.01 |
| Sup D | 01:06:49 | 23.83 |
| Sup C | 01:08:10 | 18.15 |
| Sup B | 01:15:09 | 16.67 |
| Sup D | 01:17:38 | 18.77 |
| Sup B | 01:18:57 | 17.53 |
| Sup E | 01:20:03 | 18.64 |
| Sup A | 01:25:28 | 15.80 |

Fig. 6C

METHOD AND SYSTEM FOR CONDUCTING ELECTRONIC AUCTIONS WITH MULTI-PARAMETER PRICE EQUALIZATION BIDDING

CROSS REFERENCE TO OTHER APPLICATIONS

This application is a continuation of U.S. patent application Ser. No. 09/282,157, entitled METHOD AND SYSTEM FOR CONDUCTING ELECTRONIC AUCTIONS WITH MULTI-PARAMETER PRICE EQUALIZATION BIDDING filed Mar. 31, 1999 now U.S. Pat. No. 7,249,085 which is incorporated herein by reference for all purposes.

BACKGROUND OF THE INVENTION

The disclosed invention relates generally to conducting online electronic auctions, and in particular to business-to-business bidding auctions for industrial purchasers.

Traditional Procurement Models

Procurement of supplies has traditionally involved high transaction costs, especially information search costs. The introduction of electronic commerce has introduced new methods of procurement that lower costs associated with procurement. Online procurement, or business-to-business electronic commerce, matches buyers and suppliers so that transactions can take place electronically. There are three models for online procurement: catalog, buyer-bidding auction, and supplier-bidding auction.

The "catalog" model of online procurement was the first to be developed. The first electronic catalogs were developed by suppliers to help customers obtain information about products and order supplies electronically. These first electronic catalogs were single-source; i.e. they only allowed customers to obtain information and products from that supplier.

However, customers are not typically satisfied with being "locked in" to one supplier—they wanted to be able to compare a number of competing products to be sure of getting the product features they wanted, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services has compiled a database that lists all airplane parts suppliers that have a certain item in stock. Buyers dial into the database to get information on the parts they need. Here, it is a third party, Inventory Locator Service, not a supplier, creating the unbiased electronic market.

The electronic catalog model of electronic commerce involves one buyer and one supplier at a time. When many buyers compete for the right to buy from one supplier, a buyer-bidding auction model is created. A noteworthy example of the buyer-bidding auction model is that operated by PriceLine.com and described in U.S. Pat. No. 5,794,207 issued to Walker et al. In this system, potential buyers compete for airline tickets by submitting a bid for an airline ticket on the PriceLine website, and airlines can choose to accept a bid, thereby committing the buyer to buy the ticket.

The catalog and buyer-bidding auction types of electronic markets do not work in some situations however. If the required product is custom made for the buyer, it is not possible for suppliers to publish a set price in advance for a catalog market. Likewise, it is not possible for buyers to specify all of the details of the product they want to purchase in a buyer-bidding auction. Traditionally, when a company requires a custom industrial product, procurement is made by a buyer for the company who searches for a potential supplier and acquires custom-tailored price quotes from a supplier for the needed custom product. The search is slow and somewhat random because it usually relies heavily on personal relationships. The costs associated with locating vendors, comparing their products, negotiating, and paperwork become big factors in a purchase decision. The cost of switching suppliers is very large, which means that the quoted price is probably not the lowest fair price and it is hard for a new supplier to enter the market.

As an alternative, buyers use auctions to save money. The assignee of the present application developed a system wherein suppliers downwardly bid against one another to achieve the lowest market price in a supplier-bidding auction.

In a supplier-bidding auction, bid prices typically start high and move downward in reverse-auction format as suppliers interact to establish a closing price. The auction marketplace is one-sided, i.e. one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers do not typically purchase one component at a time. Rather, they purchase whole families of similar components. At times, components are strongly related to one another. As an example, a buyer might purchase a given plastic knob in two different colors, or might purchase a nameplate in four different languages. These parts are so similar that by definition they must be purchased from the same supplier—all of the knobs are made using the same mold. These items are therefore grouped into a single lot. Suppliers in industrial auctions must provide unit price quotes for all line items in a lot.

Auction Process

Auction Process The process for a supplier-bidding auction is described below with reference to FIGS. 1 and 2. FIG. 1 illustrates the functional elements and entities in a supplier-bidding auction, while FIG. 2 is a process diagram that identifies the tasks performed by each of the involved entities.

The supplier-bidding auction model requires that the bidding product or service be defined by the buyer 10. An auction coordinator 20 works with buyers 10 to prepare for and conduct an auction and to define the potentially new supply relationships resulting from the auction.

As shown in FIG. 2, in the Initial Contact phase 102 of the auction process, the coordinator 20 contacts the buyer 10, and the buyer 10 provides data to the coordinator 20. The coordinator 20 prepares a specification 50 for each desired product or part 52. Once the product 52 is defined, potential suppliers 30 for the product are identified. The coordinator 20 and buyer 10 work together to compile this list of potential suppliers from suppliers already known to the buyer 10 as well as suppliers recommended by the coordinator 20.

The buyer 10 makes a decision regarding which potential suppliers 30 will receive invitations to the upcoming Auction. Suppliers 30 that accept Auction invitations are then sent notices regarding the upcoming Auction, as well as client software to install in preparation of participating in the Auction.

In the RFQ phase 104, the coordinator 20 works with the buyer 10 to prepare a Request for Quotation ("RFQ") 54. The coordinator 20 collects and maintains the RFQ data provided by buyer 10, and then publishes the RFQ 54, and manages the published RFQ 54. The RFQ 54 includes specifications 50 for all of the parts 52 covered by the RFQ 54. In the RFQ 54, buyer 10 aggregates similar part or commodity line items into job "lots." These lots allow suppliers 30 to bid on that portion of the business for which they are best suited.

During the auction 56, bids 58 will be taken against individual lots (and their constituent parts 52) within RFQ 54. While suppliers 30 must submit actual unit prices for all line items, the competition in an Auction is based on the aggregate value bid for lots. The aggregate value bid for a lot depends upon the level and mix of line item bids and the quantity for each line item. Therefore, suppliers 30 submit bids at the line item level, but compete on the lot level.

In the Auction Administration phase 106, coordinator 20 coordinates the Auction and administers the Auction setup and preparation. The coordinator 20 sends a RFQ 54 to each participating supplier 30, and assists participating suppliers 30 with preparation for the Auction.

In the Auction phase 108, suppliers 30 submit bids 58 on the lots and monitor the progress of the bidding by the participating suppliers 30. The coordinator 20 assists, observes, and administers the Auction.

When the bidding period is over, the auction enters the Auction Results Administration phase 110. In this phase, coordinator 20 analyzes and administers the Auction results, which are viewed by buyer 10. The buyer 10 begins to conduct final qualification of the low bidding supplier(s). The buyer 10 retains the right not to award business to a low bidding supplier 30 based on final qualification results or other business concerns.

In the ensuing Contract Administration phase 112, the coordinator 20 facilitates settlements 60 awarded by the buyer 10 to suppliers 30. Contracts 52 are then drawn up between buyer 10 and suppliers 30.

Communications and Software

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider 40 accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. The client component is used by suppliers 30 to make bids during the Auction. The bids are sent via the network service provider 40 to the site of the coordinator, where it is received by the server component 23 of the software application. The client component 31 includes software used to make a connection through telephone lines or the Internet to the server component 23. Bids 58 are submitted over this connection and updates are sent to connected suppliers.

Bids 58 can only be submitted using the client component 31 of the application—this ensures that buyers do not circumvent the bidding process, and that only invited suppliers participate in the bidding. Typically, bidders can see their bids and bids placed by other suppliers for each lot on the client component 31. When a bidder submits a bid, that bid is sent to the server component 23 and evaluated to determine whether the bid is from an authorized bidder, and whether the bid has exceeded a pre-determined maximum acceptable price. Bids placed by a supplier are broadcast to all connected bidders thereby enabling every participating bidder to see quickly the change in market conditions and begin planning their competitive responses.

SUMMARY OF THE INVENTION

Traditional online auctions focus on price as the sole variable upon which the online competition is based. Price is the sole bidding parameter that is provided by the bidders and hence is the sole parameter upon which a selection process is made. Relative valuations between different bid prices is quick and intuitive.

In a typical business-to-business situation, however, a plurality of parameters are considered in combination with the bidder's price proposal. In these situations, the buyer traditionally negotiates with each bidder independently because multi-parameter bids cannot be readily compared. As a simplified example, consider coal. Coal varies in its thermal content (i.e., BTU content) as well as in its sulfur content. Buyers would be willing to pay more, all things being equal, for higher thermal content or lower sulfur content. Sellers cannot readily change the composition of their coal. Therefore, it has traditionally been difficult to conduct an auction for coal, because not all coal is equal.

The present invention creates a competitive auction for goods or services that traditionally could not take advantage of natural auction dynamics. Competition is fostered through the real-time transformation of multi-parameter bids into comparable units of measure. The transformation process is an expression of the relative impact (or weighting) of each of the individual bidding parameters. In this manner, the transformation process enables an apples-to-apples comparison of multi-parameter bids.

The present invention also enables bidders to view an ongoing auction in their own context. In other words, bidders see current market conditions in relation to their own product parameters. This context viewing feature is enabled through the de-transformation of bidder market feedback into individual bidder contexts. Through the de-transformation process, each bidder can simultaneously view a relative comparison of bids in their own context.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the tasks performed by the entities involved in an auction process;

FIGS. 6A-6C illustrate bid history charts based upon buyer and supplier viewpoints.

DETAILED DESCRIPTION

Figure 1:
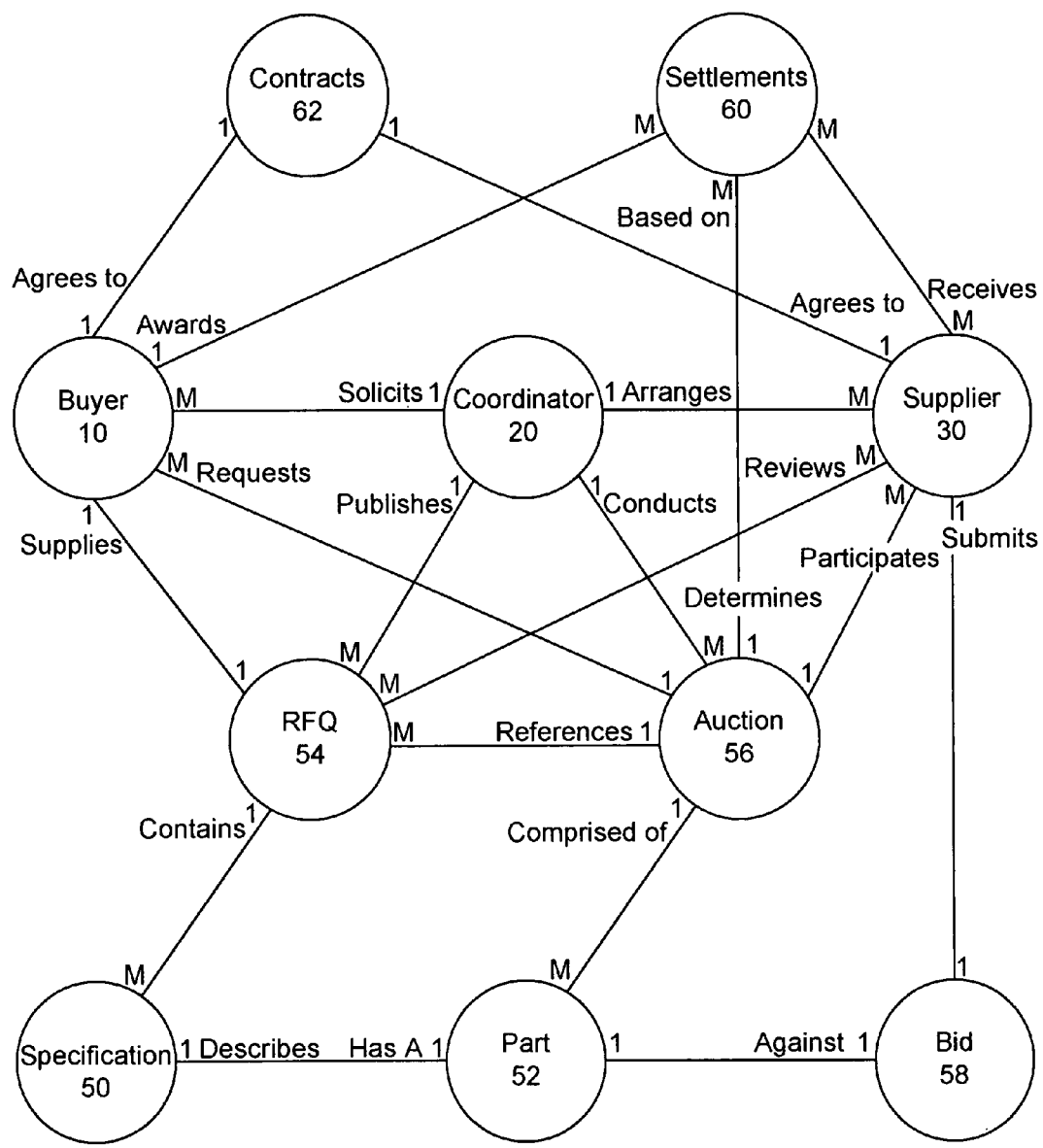
FIG. 1 illustrates the elements and entities involved in an auction process.
Figure 3:
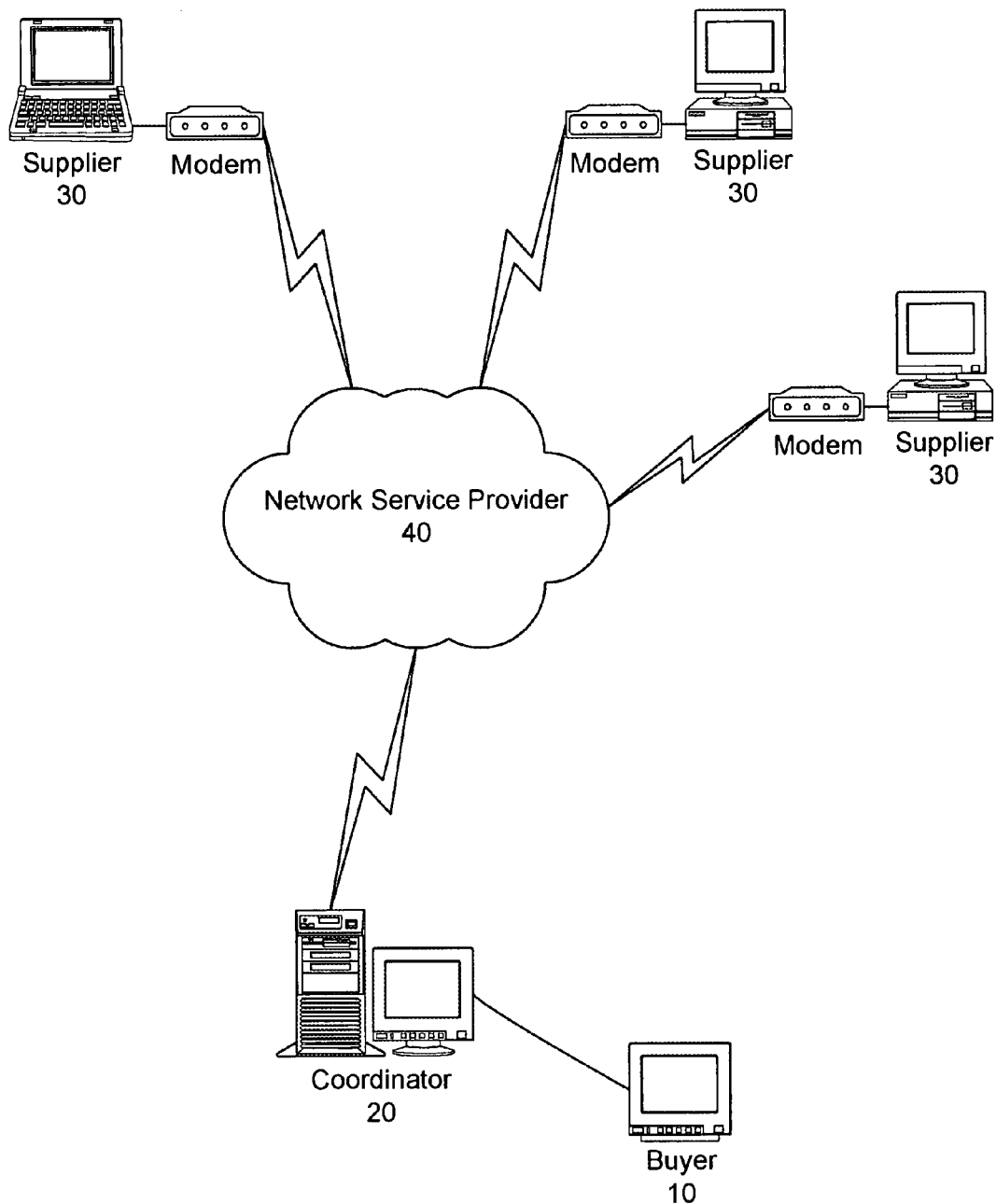
FIG. 3 illustrates the communications links between the coordinator and the potential suppliers in an auction.
Figure 4:
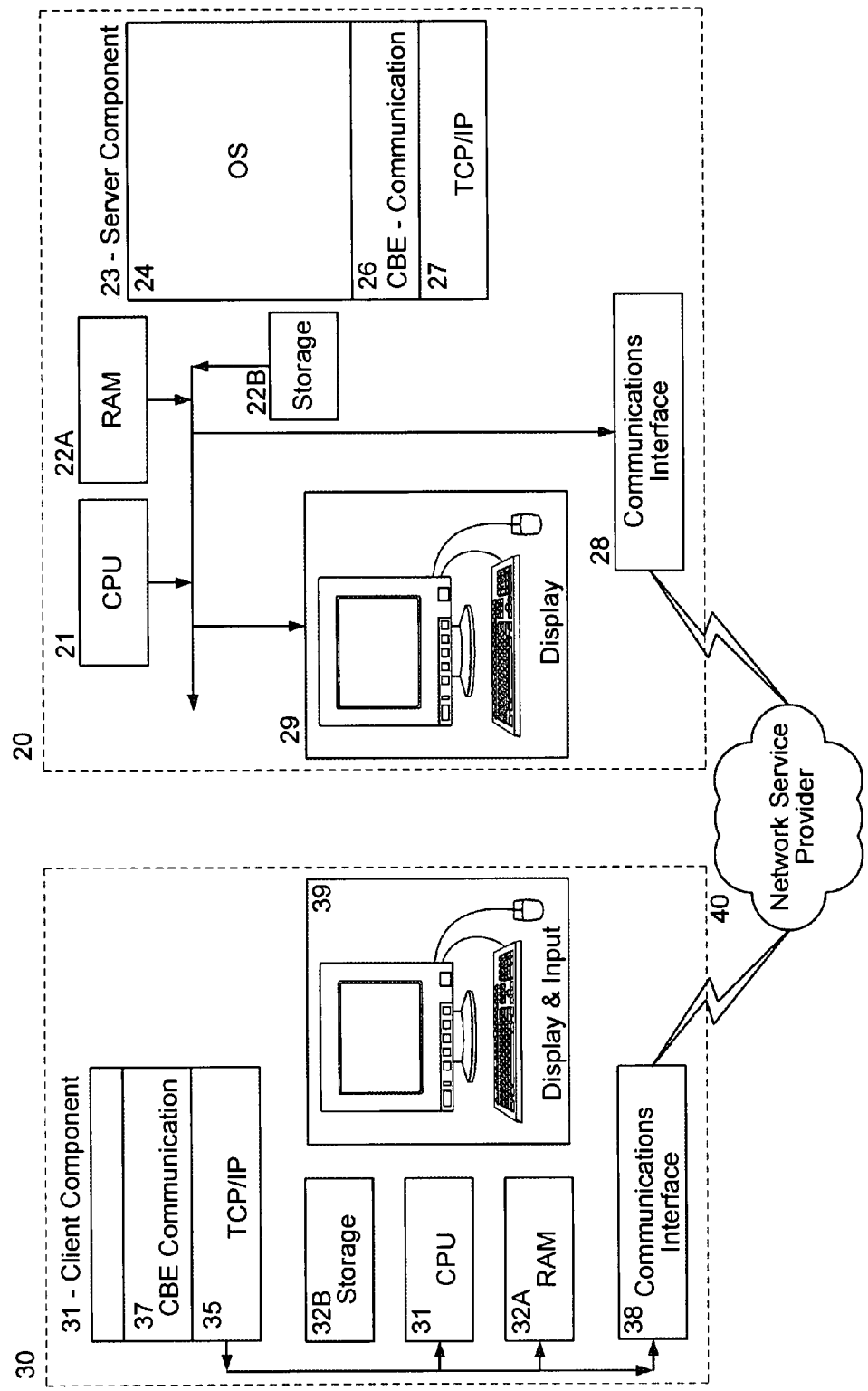
FIG. 4 illustrates the client and server components of the computer software application that conducts the auction and the hardware at the sites of the coordinator and the potential suppliers on which the client and server components operate.

Reference will now be made in detail to the preferred embodiments of the present invention, examples of which are illustrated in the accompanying drawings. The present invention described below extends the operation of the inventive auction system and method described in greater detail in application Ser. No. 09/252,790 entitled "Method and System for Conducting Electronic Auctions," filed Feb. 19, 1999, now U.S. Pat. No. 6,230,146, issued May 8, 2001, the disclosure of which is hereby expressly incorporated in the present application.

Traditional online auctions focus on price as the sole variable upon which the online competition is based. Price is the sole bidding parameter that is provided by the bidders and hence is the sole parameter upon which a selection process is made. Relative valuations between different bid prices is quick and intuitive.

In many types of business transactions, price is not the sole parameter upon which a decision is made. For example, in the negotiations for a supply contract, a buyer will compare various proposals not only on the basis of price but also on the basis of the non-price characteristics of non-standard goods, the location of the supplier, the reputation of the supplier, etc. In a typical business-to-business situation, a plurality of parameters are considered in combination with the supplier's price proposal.

In these situations, purchasers traditionally negotiate with each supplier independently because multi-parameter bids cannot be readily compared. Actual comparisons by the purchaser are based on a combination of subjective and objective weighting functions. Bidders do not typically have access to information on the buyer-defined weighting functions. At most, bidders would be selectively informed (at their disadvantage) of aspects of other competing bids. The limited communication of information between bidders limits the potential of true competition between the bidders. The absence of competition lowers the likelihood that the bidders will approach their true walk-away bid. Further, the manual weighting process is time consuming and subject to inconsistency from one application to the next.

The present invention is designed to create a market of competition in business transactions that traditionally could not take advantage of natural auction dynamics. Competition is fostered through the transformation of multi-parameter bids into comparable units of measure. This transformation process enables an apples-to-apples comparison of disparate bids. The following description of the features of the present invention is presented in the context of downward-based online industrial auctions. As would be appreciated by one of ordinary skill in the relevant art, these inventive features could also be applied in the context of upward-based online auctions as well.

As noted, multi-parameter bids cannot be readily compared. Comparison of multi-parameter bids cannot be realized unless the relative impact (or weighting) of each of the individual bidding parameters is known. Intuition that is based on subjective assessments (or valuations) of multiple bid parameters cannot create an efficient market because subjective assessments are inconsistently applied and applied after lengthy delays. Multi-parameter bid transformation enables true auction competition because it forces a greater degree of objectivity into the valuation process and is accomplished in real-time, allowing an auction dynamic to occur. Comparison of bids can therefore be accomplished in accordance with one or more comparative bid parameters.

Figure 5:
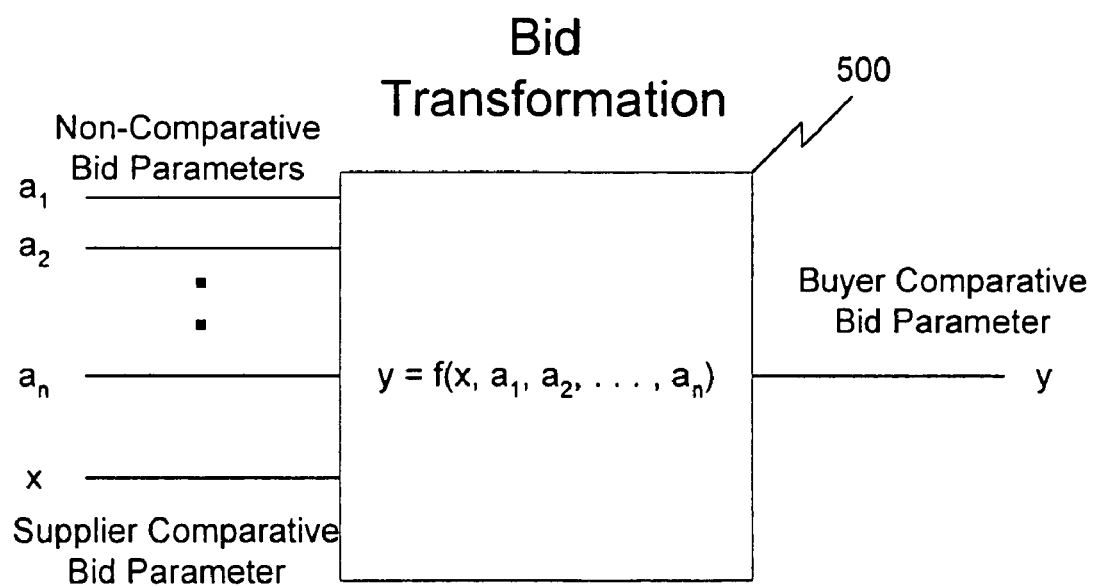
FIG. 5 illustrates a bid transformation function.

A generic transformation mechanism is illustrated in FIG. 5. As illustrated, bid transformation 500 represents a function (f) that is operative on input variables (x) and ($a_1 \ldots a_n$). Input variables ($a_1 \ldots a_n$) represent non-comparative bid parameters, while input variable (x) represents a supplier comparative bid parameter (e.g., price). The output of bid transformation 500 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In the generic description of the transformation process in FIG. 5, two types of comparative bid parameters exist. A buyer comparative bid parameter (y) refers to a parameter, resulting from the transformation process, upon which the buyer will compare competing bids. A supplier comparative bid parameter (x), on the other hand, refers to an input to the transformation function (f). As will be described in greater detail below, the supplier comparative bid parameter can be used by a supplier to compare competing bids in the supplier's context. In some applications, the supplier comparative bid parameter is not used because all parties may be allowed to view the auction in the buyer's context.

As noted, non-comparative bid parameters are also used as inputs to the transformation process. Unlike supplier comparative bid parameters, non-comparative bid parameters (e.g., non-price parameters) are not directly used to compare competing bids.

In this transformation framework, a supplier comparative bid parameter value can be modified by the transformation process based upon non-comparative bid parameter values to yield a buyer comparative bid parameter value. This scenario is discussed below in the context of the coal market.

Alternatively, the transformation process can use multiple non-comparative bid parameters to create a buyer comparative bid parameter. In this case, no supplier comparative bid parameters are used to create supplier specific views. All parties view the competition in the same context. An example of this scenario is net present value (NPV) bidding, where parameters specifying multi-year contracts are converted into a total NPV bid. The total NPV bid represents a sum of a series of payments over multiple contract years, which are discounted to a present value using a predefined discount rate structure. NPV bidding is described in U.S. application Ser. No. 09/282,156, entitled "Method and System for Conducting Electronic Auctions with Net Present Value Bidding," filed Mar. 31, 1999, now U.S. Pat. No. 7,010,511, issued Mar. 7, 2006, the disclosure of which is hereby expressly incorporated in the present application.

Where a single buyer comparative bid parameter (e.g., price) is output by the transformation process, competition between bids is based on the relative magnitude of the values of the buyer comparative bid parameter associated with each of the bidders. This relative magnitude of the comparative bid parameters can be illustrated on a one-dimensional plot. Where multiple buyer comparative bid parameters are output by the transformation process, competition between bids can be compared using a multiple dimensional plot. In most cases, the use of a single buyer comparative bid parameter is advantageous because it provides the simplest means for all parties to unambiguously determine a relative ranking of bids.

The concepts and features of the present invention are now illustrated in the context of a particular application within the coal market. Coal purchase decisions are based on a variety of factors relating to the characteristics of the coal as well as the characteristics of the buyer's needs and physical facilities. Characteristics of the coal include factors such as thermal content (BTU/lb), percentage sulfur, percentage ash, percentage water/moisture, hardness, etc. Relevant characteristics of the buyer include the time frame of required delivery, types of power generation units, etc.

During negotiations with multiple coal suppliers, each of the relevant factors are evaluated in combination to determine the relative attractiveness of each of the received bids. The evaluation process is often a combination of subjective judgment, based on instinct and experience, and hard quantitative analysis. As one can readily appreciate, this evaluation process, although typical, is time consuming and adds great uncertainty for the suppliers.

Time delays are inherent since each supplier is negotiated with independently. Suppliers face great uncertainty in this process because the internal subjective/quantitative metrics used by the buyer in the evaluation process are inconsistently applied. Negotiation tactics dictate that the subjective/quantitative metrics used by the buyer are not provided to the suppliers. This confidential information gives the buyer leverage in altering the supplier's perception of the relative attractiveness of the submitted bid. During the negotiation process, suppliers may be selectively informed (at their disadvantage) of aspects of the decision making process.

Limited communication of information to the suppliers limits the potential of true competition between the suppliers. The absence of competition lowers the likelihood that the suppliers will approach their best offer.

The present invention creates true competition between suppliers in an auction system that enables comparison of truly disparate bids. While traditional auctions focus on price as the sole variable of online competition, the present invention also factors in non-price variables into the bid evaluation and award process.

In the coal market example, the buyer may be ultimately interested in the price per unit energy produced when the coal is processed through their power generation unit. As noted, all coal is not created equal. The characteristics of the particular coal being offered by a supplier is unique to the supplier. Moreover, different power generation units will produce different quantities of energy from identical coal, due to engineering differences built into the power generation units.

Bids for coal are typically submitted on a price per physical measure of weight or volume (e.g., $/ton) basis. The raw $/ton bids of the participating suppliers cannot be readily compared to each other due to the underlying characteristics of the coal. A mechanism is therefore required to transform each of the bids into a context that enables an apples-to-apples comparison such that the buyer can choose the most competitive bid. In the coal market example, the transformation process is designed to transform the $/ton bids for unique lots of coal into standardized units of value to the buyer (e.g., price-per-unit-of-energy bids such as ¢/Million BTU). After all of the $/ton bids are transformed into ¢/Million BTU bids, the buyer can readily identify the market leading bids.

It should be noted that the standardized units of value to the buyer can include various forms such as a cost per unit of thermal content from the coal, a cost per unit of electrical energy output from a generation facility burning the coal, the revenue from selling electrical energy output of a generation facility burning the coal, a measure of profit contribution from selling electrical energy output of a generation facility burning the coal, a measure of the net present value of a decision to accept the coal, wherein the decision is modeled to take into account the overall improvement in the buyer's economic condition, including revenue generated, costs avoided, risks mitigated, or asset valuation improved.

The latter example is a function that implements the notion that accepting a certain coal bid might have a portfolio effect on the buyer's overall situation, or might change the economics of a certain project. For example, a buyer might be considering whether to build a new power plant, and since coal is a high percentage of the life cycle cost of the power plant, changes in the price of coal offered to the buyer might change the overall value of the plant.

The transformation function used in the coal market has been modeled as a linear transformation. In this linear transformation, a suppliers raw $/ton bid is modified using multiplicative and additive adjustments (or factors) to yield a ¢/Million BTU bid. Each of the multiplicative and additive factors are based upon characteristics (e.g., coal characteristics, delivery specifications, etc.) of a submitted bid.

It should be noted that the characteristics of a supplier's coal may have been identified prior to the start of the auction. In this case, multiplicative and additive factors are determined prior to the start of the auction and stored in memory by the server component. During the auction process, the multiplicative and additive factors are retrieved from memory and used to transform the raw $/ton bid into a ¢/Million BTU bid. In one embodiment, a multiplicative and/or additive factor is stored by the server component for each of the characteristics of the supplier's coal. In an alternative embodiment, a single multiplicative factor and a single additive factor, representative of the cumulative effect of the characteristics of the coal in the linear transformation, is stored.

In another scenario, the characteristics of a supplier's coal are provided as part of a supplier's first submitted bid along with the raw $/ton bid to the server component. In this case, the characteristics of the supplier's coal (i.e., BTU/lb, % sulfur, % ash, % water, etc.) would be fed by the server component into the transformation function to determine, in real-time, the buyer comparative bid parameter that is the result of the transformation function. The server component may store the net result of the transformation function factors in memory for retrieval in the transformation of future bids by that supplier.

The transformation process in the coal market example can be generically characterized by the transformation process illustrated in FIG. 5. In the coal market example, the output of the transformation process is the ¢/Million BTU parameter. The ¢/Million BTU parameter represents the basis upon which a buyer will compare the bids submitted by the participating suppliers. Accordingly, the ¢/Million BTU parameter represents a buyer comparative bid parameter.

In the coal example, the transformation process takes as inputs both comparative and non-comparative bid parameters. The non-comparative bid parameters represent the characteristics of the coal (i.e., BTU/lb, % sulfur, % ash, % water, delivery time, etc.) and the characteristics of the buyer. The $/ton price parameter represents a supplier comparative bid parameter. In combination, the comparative and non-comparative bid parameters are operated upon by the transformation function (f) to yield the buyer comparative bid parameter value in ¢/Million BTU.

At this point, it should be noted that the supplier comparative bid parameter ($/ton) is significant because it enables the supplier to view a relative comparison of bids in the supplier's individual context. This feature of the present invention will be described in greater detail below in the discussion of the detransformation and feedback parts of the auction process.

After each of the submitted bids have been transformed into the buyer comparative bid parameter ¢/Million BTU, an "apples-to-apples" comparison can be performed. The "apples-to-apples" comparison can be effected in any of a variety of ways including the bid history chart of FIG. 6A. The bid history chart of FIG. 6A illustrates a relative ranking of transformed received bids in ¢/Million BTU.

Having received a bid from a participating supplier, the auction server must then broadcast market feedback to the other participating suppliers. This broadcast function creates a real-time online competition between suppliers who are able to view the activities of their competitors and plan their corresponding response strategy.

In the coal market, the specific factors used in the transformation function are often confidential to the buyer. Accordingly, the buyer desires to prevent the suppliers from gaining insight into aspects of the transformation function that quantifies the buyer's weighting of various parameters associated with a supplier's bid. For this reason, the auction server does not feedback the transformed bids to the participating suppliers. Rather, the auction server broadcasts bids that have been detransformed from the buyer comparative bid parameter (i.e., ¢/Million BTU) into the context (i.e., $/ton) of the individual suppliers.

The $/ton bid for a supplier is referred to as the supplier comparative bid parameter. As illustrated in FIG. 5, the supplier comparative bid parameter is one of the inputs into the transformation function (f). The supplier comparative bid parameter is significant because it enables the supplier to view the auction competition in his own context. In other words, a supplier can view all competing bids as if all suppliers were offering the same type of coal for sale. In this manner, a supplier can view the competitive auction landscape without receiving any information concerning the transformation function that has been defined by the buyer.

In the coal example, the transformation process is modeled as a linear function, having at least one multiplicative factor and/or at least one additive factor. This transformation can be represented by the well known algebraic function $y=mx+b$, where m is the multiplicative factor, b is the additive factor, x is the supplier comparative bid parameter, and y is the buyer comparative bid parameter.

Bids viewed in the buyer's context have been converted into the buyer comparative bid parameter (i.e., ¢/Million BTU). On the supplier side, each of the bids submitted from other participating suppliers are detransformed from the buyer comparative bid parameter into the supplier comparative bid parameter. This detransformation is accomplished by solving the formula for x to yield the formula $x=(y-b)/m$. In this detransformation process, ¢/Million BTU bid values that are to be broadcast to Supplier A are converted to $/ton bid values using the multiplicative and/or additive factors for Supplier A.

After the client component at Supplier A receives the detransformed bid values, Supplier A is then able to view a relative comparison of the bids in his own context. This relative comparison corresponds to the relative comparison of the bids in the buyer context. FIG. 6B illustrates a bid history chart in the context of Supplier A. In this example, it is assumed that Supplier A's multiplicative and additive factors are, m=0.87 and b=80, respectively.

As FIG. 6B demonstrates, Supplier A can view the competitive climate of the auction without having access to any of the details of the transformation function (f) implemented by the buyer. From Supplier A's perspective, all other suppliers are bidding the same type of coal. Competition is therefore perceived as being based on the $/ton price, not the ¢/Million BTU price. If Supplier A decides to beat the market leading bid, Supplier A would simply reduce his $/ton bid and submit the new bid (e.g., bid of $17.01/ton bid at 01:25:28) to the auction server. The new $17.01/ton bid would then be transformed into a 94.8 ¢/Million BTU bid, i.e., +80=94.8 ¢/Million BTU, using the multiplicative and additive adjustments for Supplier A.

In a similar manner, Supplier B can also view the competitive climate of the auction without having access to any of the details of the transformation function implemented by the buyer. Supplier B's view is illustrated in FIG. 6C. In this example, it is assumed that Supplier B's multiplicative and additive factors are, m=0.81 and b=82, respectively. In Supplier B's view, Supplier A's new bid of $17.01/ton (or 94.8 ¢/Million BTU) at 01:25:28 is fed back to Supplier B as a $15.80/ton bid, i.e., (94.8−82)/0.81=$15.80/ton, using Supplier B's multiplicative and additive parameters.

In combination, FIGS. 6A-6C illustrate a feature of the present invention that enables each supplier to view the auction in his own context. These buyer-specific and supplier-specific contexts enable the system to create a coal auction market without revealing confidential information to the suppliers. The creation of an online electronic auction greatly benefits the buyer by allowing the buyer to get true market prices. The online electronic auction can easily produce hundreds of bids in a span of a few hours. This is in sharp contrast to traditional coal market mechanisms that relied upon the simultaneous occurrence of independent negotiations over a course of weeks.

It should be noted that a supplier may simultaneously offer a plurality of products of differing technical specifications. In this case, the transformation function must treat these offerings separately. Each offering has its own context, and an array of detransformed bid values unique to that offering.

It should be noted that a supplier could also modify a bid by changing a non-price parameter. For example, instead of changing the $/ton bid, a supplier could choose to change a particular characteristic (e.g., % ash, % sulfur, etc.) of the coal that is being bid. This new type of coal can be based upon a mixture or blend of different types of coal within the supplier's control. By adjusting the characteristics of the coal, the supplier is effectively adjusting the multiplicative factor and/or additive factor that defines his transformation function. For this reason, the new blend of coal would define a new context for that supplier. The supplier would then have the option of amending an existing offering or creating a second offering. If the supplier creates a new offering, viewing that new blended bid within the context of the auction market would require a second bid history chart. In effect, the supplier has entered two horses into the race. This has the additional benefit to suppliers of allowing them to balance their own supply with market demand in the most beneficial manner.

Another example of transformation bidding is multi-currency bidding. Multi-currency bidding is an auction format wherein the buyer views all submitted bids in a base currency (e.g., U.S. dollars), while each of the suppliers view all submitted bids in a local currency (e.g., Japanese Yen, Swiss Francs, etc.). Multi-currency bidding is described in U.S. application Ser. No. 09/282,158, entitled "Method and System for Conducting Electronic Auctions with Multi-Currency Bidding," filed , Mar. 31, 1999, the disclosure of which is hereby expressly incorporated in the present application.

In the multi-currency bidding example, the local currency represents a supplier comparative bid parameter. The exchange rate between the local currency and the base currency represents a non-comparative bid parameter. It should be noted that in the multi-currency example, the non-comparative bid parameter is provided by the buyer or independent party instead of the supplier. In effect, the supplier's bid is a single parameter (i.e., local currency price) to be transformed into a buyer comparative bid parameter (i.e., base currency price).

In a similar fashion as the coal market example, each of the suppliers can view the auction in their own context (or local currency). Here, confidentiality of the transformation process is not the driver for separate supplier views. Rather, separate supplier views are desired because of user unfamiliarity of viewing prices in a foreign currency. Detransformation is represented by the conversion of base currency bids into the relevant local currency.

In the multi-currency bidding application, the exchange rates are not confidential. Accordingly, the transformation/detransformation process can be performed at the client component and/or the auction server component. For example, assume that Supplier A is bidding in Japanese Yen, Supplier B is bidding in Swiss Francs, and the buyer is viewing the auction in U.S. dollars. The client component of Supplier A can submit the bid in Yen or in U.S. dollars. If the bid is to be submitted in U.S. dollars, the client component is configured to convert the bid to dollars prior to submission to the auction server.

On the receiving end, the client component of Supplier B can receive a bid price submitted by Supplier A in Yen, U.S. dollars or Swiss Francs. If the auction server sends a bid submitted by Supplier A in yen to Supplier B, the auction server is performing the detransformation process (i.e., currency exchange to Yen). In this case, no currency conversion is required by the client component of Supplier B. Alternatively, the client component of Supplier B can be configured to perform the currency exchange of Supplier A's bid. This currency exchange can be based upon the receipt of a bid in the base currency (U.S. dollars) or Supplier A's local currency (Yen). In this case, the currency conversion is performed by the client component of Supplier B prior to the display of Supplier A's bid to Supplier B.

In other embodiments, multi-parameter price equalization bidding can be used to solve other problems when price alone cannot adequately discriminate between a plurality of offerings. One example concerns transportation costs. Because buyers often control inbound transportation and have favorable contract rates, the transformation function might be configured to translate bids of FOB supplier pricing into bids of FOB buyer. Another example concerns penalty factors buyers might apply. Some suppliers may be assessed penalties due to additional cost factors the buyer might have to assume. For example, an overseas supplier might be automatically penalized a given percent or fixed amount to cover the extra costs of travel, input/export duties, and international banking fees.

In other embodiments, the transformation function that converts the supplier comparative bid parameter into buyer comparative bid parameters might be non-linear. This non-linear transformation may be implemented in a variety of ways. In one embodiment, the algebraic transformation function (f) is defined as a non-linear function rather than a linear function. The form of this function might be a polynomial such as $y=nx^2+mx+b$. It might also use logarithms or power functions.

In another embodiment, the transformation function (f) uses lookup tables. A lookup table is a form of transformation function whereby a given input value or range of input values is translated into a given output value. The lookup table is constructed in advance in such a way that all possible values of input are translated into an acceptable value of output.

Non-linear transformation functions can serve to provide additional emphasis to certain parameters. For example, a product's value may rise at a faster rate as a certain quality factor approaches perfection. The value of a perfect diamond, for example, can be many times higher than the value of a slightly imperfect diamond. However, as the level of imperfection rises, the drop off in value slows. This is a non-linear transformation from an engineering attribute into value.

Lookup tables can be used to simplify preparation. For example, consider the problem of translating FOB supplier prices into FOB buyer prices, including transportation costs between a supplier and a buyer. In theory, a linear transportation function might be used to apply an additive factor such as "cents per unit per mile shipped." In practice, it can be far simpler to prepare an auction using a rule such as "within 100 miles shipping is $0.01 per unit, between 101-250 miles shipping is $0.03 per unit, and above 250 miles shipping is $0.05 per unit." In this case, a lookup table provides an easier implementation. In this framework, supplier A located 60 miles from the buyer would be assessed $0.01 per unit for shipping, while supplier B located 105 miles from the buyer and supplier C located 230 miles away would both be assessed $0.03 per unit.

It should be noted that a combination of linear, non-linear, and lookup table transformations might apply to any given auction. For example, a linear transformation function might be used, where various additive transformation factors are themselves the output values from a lookup table, another linear function, or a non-linear function. In other words, the transformation functions may be nested to include more than one type of calculation in any given embodiment.

Generally, where the transformation function is non-confidential, the transformation process can be implemented individually or jointly by the auction server component and the individual client components. The joint implementation can be designed in various ways to achieve the same goal, the support of individual buyer and supplier views.

As noted above, the transformation process can also be used in a context where only a single view of the auction is available. Here, the buyer and each of the participating suppliers each view the auction based on the buyer comparative bid parameter (e.g., NPV bidding).

While the invention has been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions the auction functions can be equally applied to upward pricing auctions. Thus, it is intended that the present invention cover the modifications and variations of this invention provided they come within the scope of the appended claims and their equivalents.

What is claimed is:

1. A method for conducting an auction, comprising:
obtaining, from a buyer, information associated with a product to be purchased using an auction, wherein the buyer purchases the product from a winning bidder;
making the obtained information associated with the product available to at least a first bidder and a second bidder;

receiving, from the first bidder, a first bid that includes a first price and a first non-price information;

receiving, from the second bidder, a second bid that includes a second price and a second non-price information, wherein non-price information is associated with (1) a description of a particular product a given bidder will provide in the event the given bidder wins the auction and/or (2) delivery of a product by the given bidder in the event the given bidder wins the auction;

generating, using a processor, a first comparison value based at least in part on the first price and the first non-price information;

generating, using a processor, a second comparison value based at least in part on the second price and the second non-price information;

comparing the first comparison value and the second comparison value; and selecting the winning bidder of the auction based at least in part on the comparison.

2. A method as recited in claim 1, wherein the first non-price information includes delivery time.

3. A method as recited in claim 1, wherein the first non-price information includes delivery distance.

4. A method as recited in claim 1, wherein the first and second bidders respectively produce first and second versions of a product and the first and second non-price information are respectively associated with the first and second versions of the product.

5. A method as recited in claim 1, wherein the first and second bidders respectively have first and second batches of a product with an immutable characteristic and the first and second non-price information are respectively associated with the immutable characteristic for the first and second batch.

6. A method as recited in claim 1, wherein the first comparison value includes revenue for the buyer.

7. A method as recited in claim 1, wherein the first comparison value includes risk for the buyer.

8. A method as recited in claim 1 further comprising making information associated with the first bid available to the second bidder.

9. A method as recited in claim 8, wherein information is made available in real time.

10. A method as recited in claim 1, wherein generating the first comparison value includes using a linear transformation.

11. A method as recited in claim 1, wherein generating the first comparison value includes using a nonlinear transformation.

12. A method as recited in claim 1, wherein generating the first comparison value includes using a lookup table.

13. A method as recited in claim 1, wherein the first price is in a first currency and the second price is in a second currency.

14. A system for conducting an auction, comprising:
an interface configured to:
obtain, from a buyer, information associated with a product to be purchased using an auction, wherein the buyer purchases the product from a winning bidder;
make the obtained information associated with the product available to at least a first bidder and a second bidder;
receive, from the first bidder, a first bid that includes a first price and a first non-price information; and
receive, from the second bidder, a second bid that includes a second price and a second non-price information, wherein non-price information is associated with (1) a description of a particular product a given bidder will provide in the event the given bidder wins the auction and/or (2) delivery of a product by the given bidder in the event the given bidder wins the auction; and
a processor configured to:
generate a first comparison value based at least in part on the first price and the first non-price information;
generate a second comparison value based at least in part on the second price and the second non-price information;
compare the first comparison value and the second comparison value; and
select the winning bidder of the auction based at least in part on the comparison.

15. A method as recited in claim 1, wherein the first non-price information includes delivery time.

16. A method as recited in claim 1, wherein the first and second bidders respectively have first and second batches of a product with an immutable characteristic and the first and second non-price information are respectively associated with the immutable characteristic for the first and second batch.

17. A method as recited in claim 1, wherein the first comparison value includes revenue for the buyer.

18. A method as recited in claim 1, further comprising a display configured to make information associated with the first bid available to the second bidder.

19. A method as recited in claim 1, wherein the processor is configured to generate the first comparison value by using a linear transformation.

20. A computer program product for conducting an auction, the computer program product being embodied in a non-transitory computer readable medium and comprising computer instructions for:
obtaining, from a buyer, information associated with a product to be purchased using an auction, wherein the buyer purchases the product from a winning bidder;
making the obtained information associated with the product available to at least a first bidder and a second bidder;
receiving, from the first bidder, a first bid that includes a first price and a first non-price information;
receiving, from the second bidder, a second bid that includes a second price and a second non-price information, wherein non-price information is associated with (1) a description of a particular product a given bidder will provide in the event the given bidder wins the auction and/or (2) delivery of a product by the given bidder in the event the given bidder wins the auction;
generating a first comparison value based at least in part on the first price and the first non-price information;
generating a second comparison value based at least in part on the second price and the second non-price information;
comparing the first comparison value and the second comparison value; and selecting the winning bidder of the auction based at least in part on the comparison.

* * * * *